Feb. 3, 1931.  P. J. M. ESCOLE  1,790,700
GLASS SPREADING ROLL
Filed April 21, 1927  3 Sheets-Sheet 2
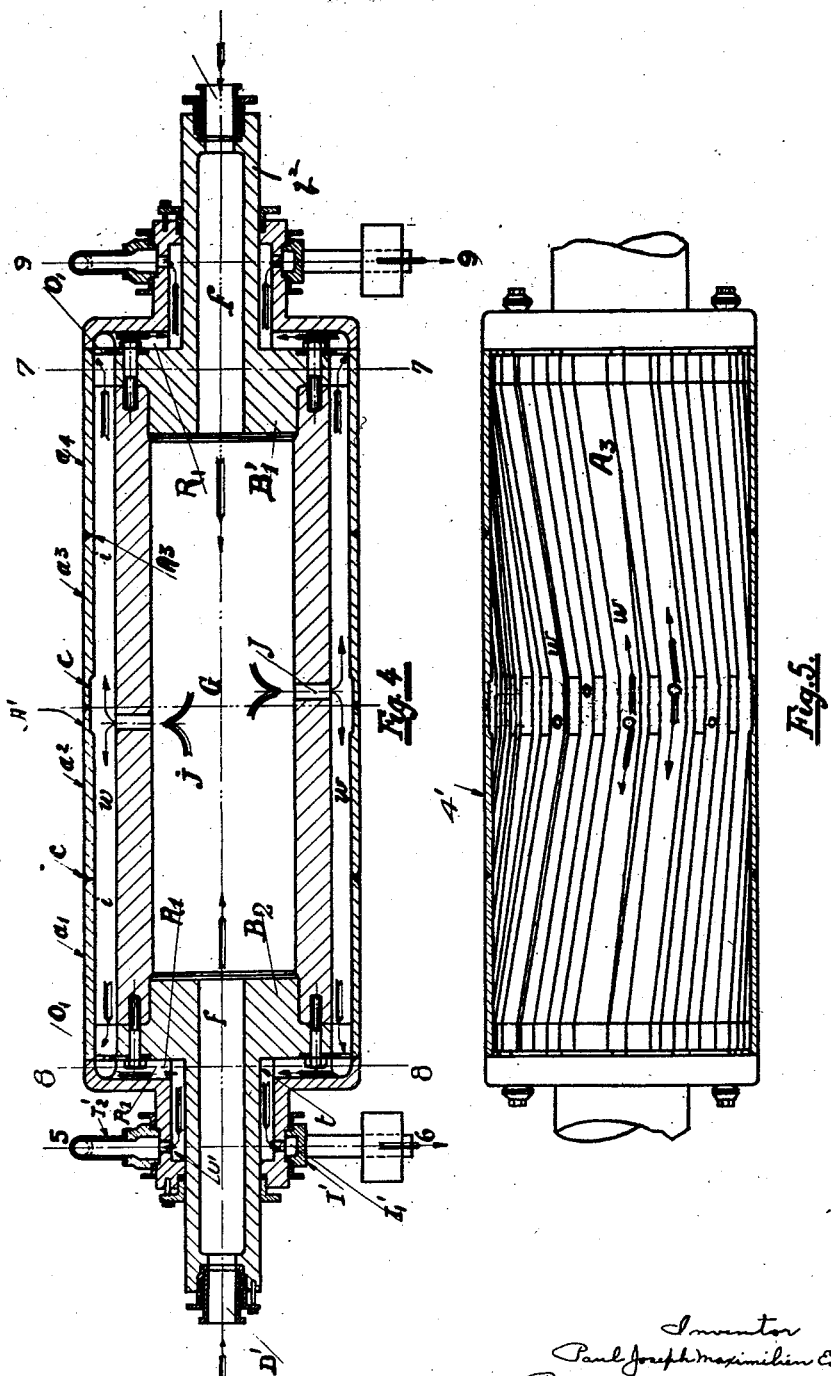

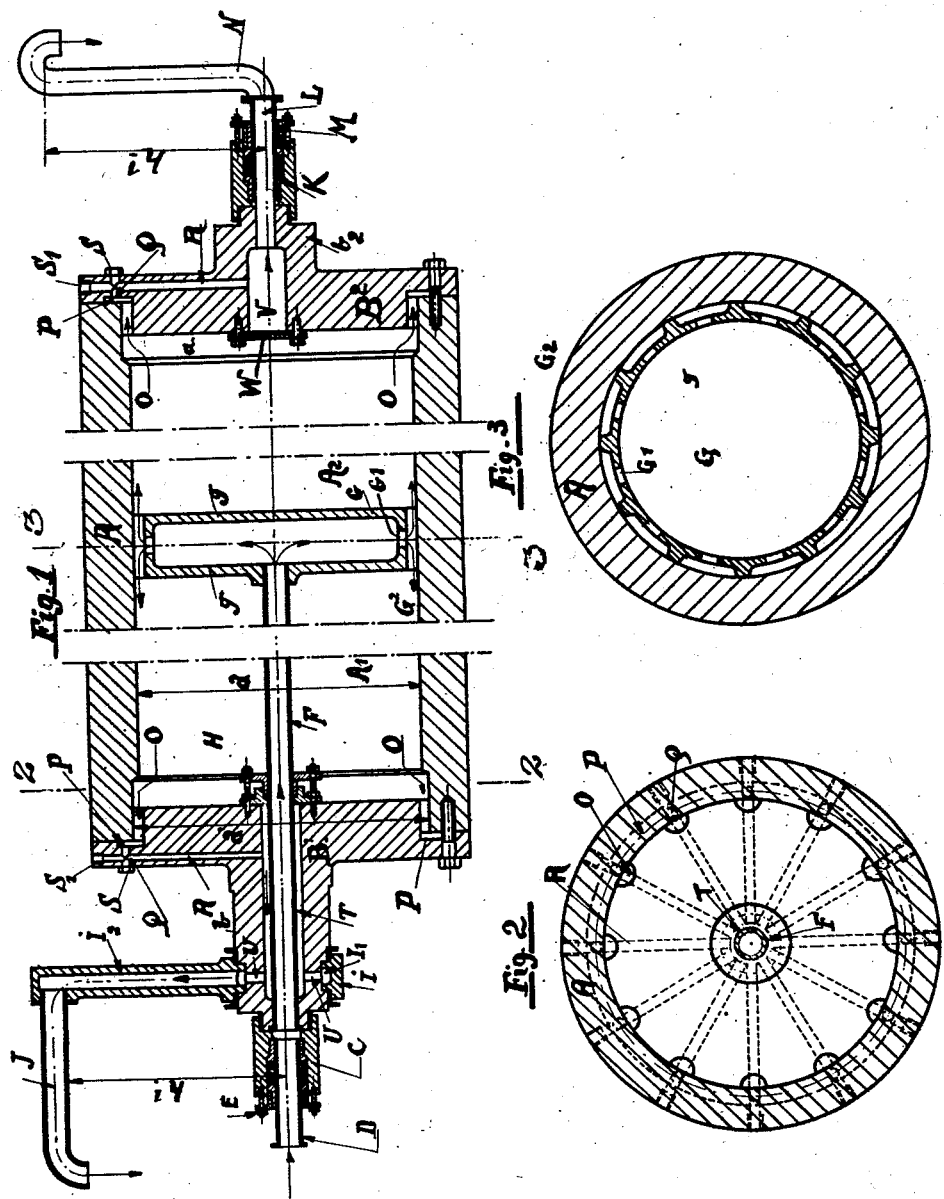

Feb. 3, 1931. P. J. M. ESCOLE 1,790,700
GLASS SPREADING ROLL
Filed April 21, 1927  3 Sheets-Sheet 3
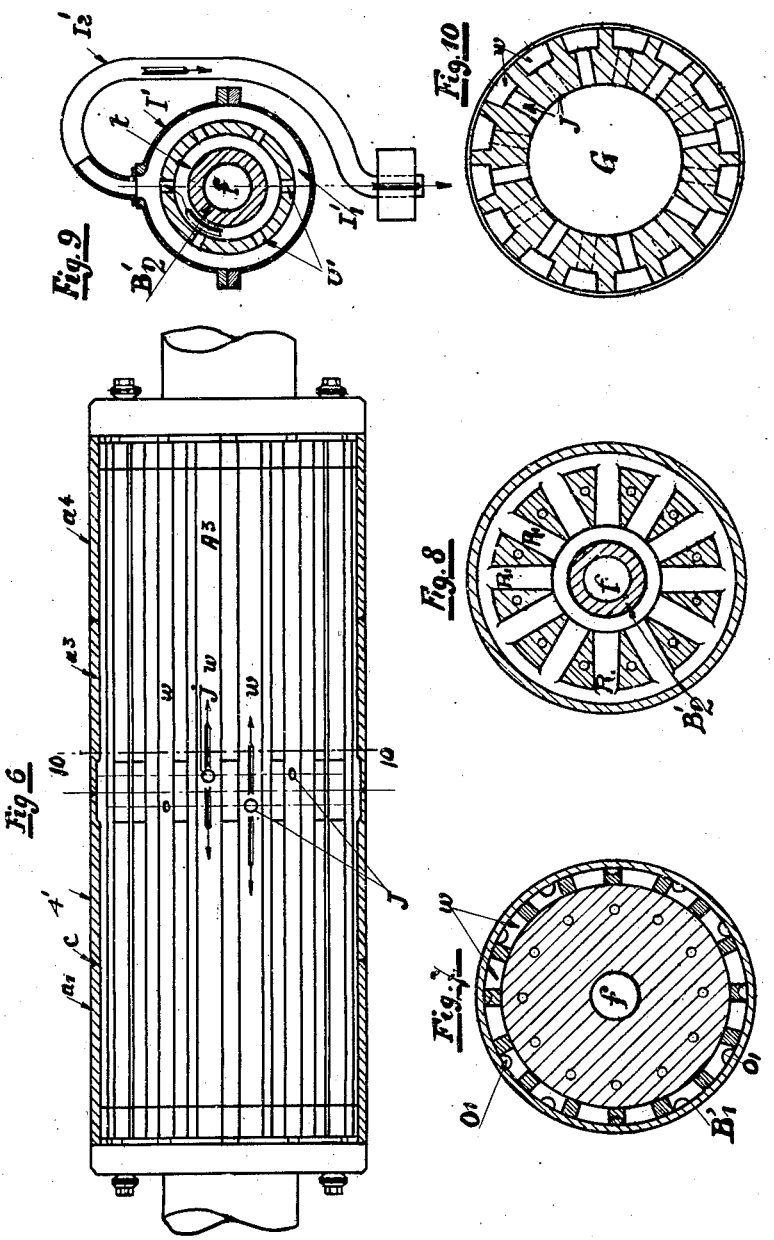

Patented Feb. 3, 1931

1,790,700

UNITED STATES PATENT OFFICE

PAUL JOSEPH MAXIMILIEN ESCOLE, OF JEUMONT, FRANCE, ASSIGNOR TO SOCIETE ANONYME DES ATELIERS DE CONSTRUCTION & FONDERIES DE JEUMONT (ANCIENS ETABLISSEMENTS TH. HAUT), OF JEUMONT, FRANCE, A COMPANY OF FRANCE

GLASS-SPREADING ROLL

Application filed April 21, 1927. Serial No. 185,544.

The present invention relates to spreading rolls for the manufacture of plate glass and sheet glass of all kinds, produced by rolling and pressing, and has for its object to provide an improved arrangement of water-cooled roll of which the outer diameter remains truly cylindrical in spite of rise of temperature.

Thus the product obtained, viz. rolled and pressed plate or sheet glass, is of substantially uniform thickness.

The pouring of plate glass is carried out at present in various ways, to wit:

(1) Upon a casting table, in which case the spreading roll, resting at its ends upon guide rails of adjustable height at the edges of the table, determines the thickness of the sheet;

(2) Between two rolls or cylinders, the molten glass being poured between these cylinders and the thickness of the sheet determined by the gap between them;

(3) Between two cylinders as in the previous case, but with the molten glass supplied directly and in a continuous manner from a channel in communication with the melting tank.

In the application of these three pouring systems, the rolls are generally cooled by a current of water entering at one end thereof, circulating in the interior and leaving at the opposite extremity of the roll. It has also been proposed to supply the cooling water at both ends, with a central outlet pipe, or through a central inlet pipe with discharge at both ends.

This cooling water is delivered under a head or pressure but by reason of the arrangement of the entry and the exit, any air present inside the roller or contained in the cooling water can only partly escape from the roll. The mass of air which thus remains imprisoned in the interior of the roll is compressed by the pressure of the water but cannot escape; consequently this air prevents the water from coming into contact at the same time with the whole internal surface of the roll. The results are irregularities of expansion and therefore deformations of the external generatrices of the roll, producing differences of thickness in the sheet of glass.

The present invention has for its main object to obviate these disadvantages.

The cooling water, supplied under pressure or head, enters the roll at one end, or even at both extremities at the same time, and is led to the centre of the length of the roll. It then flows in equally divided portions towards the two ends, where in order to escape, it is compelled to follow various passages, the total sectional area of which is equal to or less than the cross section at the entry. These exit-passages are distributed in the end closure members of the roll over circumferences having diameters greater than the internal diameter of the roll.

By reason of these arrangements, with the cooling water supplied under pressure or head and introduced into the roll as already explained, the level of water rises in the interior of the roll and the trapped air is completely expelled through those of the passages in question which are situated at the highest position; the water is therefore enabled to fill the whole internal capacity before flowing out in the normal manner.

If, in the course of working, the air contained in the water separates out and rises to the upper part of the internal capacity of the roll, it is immediately swept out by the discharge of water.

It results from the foregoing explanation that the cooling of the spreading roll is very regular and that the deformations due to heat are reduced to nil or to such an extent that the product obtained has a substantially uniform thickness.

Nevertheless, in the case of very long rolls it may happen that the exterior surface presents a certain incurvation or concavity of face, and therefore the thickness of the product obtained is not constant.

With the object of remedying this last mentioned drawback, the outer wall is constituted according to a further feature of the invention by a series of juxtaposed cylinders of small cross-section, made for example of steel, these cylinders being suitably connected together as by welding or soldering so as to form a jacket made substantially in a single piece. This jacket surrounds an inner rigid cylinder, made of cast-iron, of large cross-section, in which are provided interspaced passages leading the cooling water to longitudinal channels formed at the periphery of the said inner cylinder in such a way that the water comes in direct contact with the outer jacket.

This arrangement comprises details of practical construction which will be described hereafter.

Upon the annexed drawings, to which reference is made in the subsequent description;

Figure 1 represents by way of example, partly in longitudinal section, a spreading roll arranged according to the invention.

Figure 2 is a transverse section along the line 2—2 of Figure 1.

Figure 3 is a transverse section along the line 3—3 of Figure 1.

Figure 4 represents by way of example and in longitudinal section, a second form of construction according to the invention, for spreading rolls of great length.

Figure 5 is a modification of the foregoing showing a particular arrangement of the cooling channels for facilitating the discharge of air suspended in the water.

Figure 6 is a corresponding plan view, the outer jacket being represented in section.

Figure 7 is a section along the line 7—7 of Figure 4.

Figure 8 is a section along the line 8—8 of Figure 4.

Figure 9 is a section along the line 9—9 of Figure 4.

Figure 10 is a section along the line 10—10 of Figure 6.

Referring to Figures 1–3, the body of the spreading roll is formed by a cylindrical tube A of a certain internal diameter $d$ comprising at each of its extremities a cylindrical counterbore $a$ of diameter $d'$ into which there is tightly fitted the end closure members B1 and B2.

The member B1 presents an external boss or prolongation $b$ of smaller diameter than the diameter $d$ of the bore of the tube A, this boss forming a trunnion or bearing, and being connected by a sleeve C provided with a stuffing box E to the stationary tube D through which the water is supplied. Internally the member B1 comprises, in axial line with the tube D, a tube F which places the tube D in connection with the central feed chamber G of which the vertical circular walls $g$ divide the interior capacity of the roller A into two compartments A1 and A2 of equal volume.

A stuffing box H isolates the interior of the compartment A1 from the water exit channel T provided in the end member B1 concentrically with the tube F. At the periphery of the portion of the member B1 fitting into the counterbore $a$ of the roll A, there are provided at regular intervals channels O of semi-circular cross section (see particularly Figure 2 of the drawings) which extend into an annular chamber P of which the outer diameter is greater than $d$ and $d'$.

In this annular chamber P there are provided orifices Q, of number equal to that of the channels O, and distributed regularly around a circumference likewise of larger diameter than $d$ and $d'$, these orifices connecting the said chamber P with radial passages R. In practice, the orifices Q and the passages R extend to the exterior of the member B1, but their outer ends are closed by screw plugs S, S1.

The passages R extend into the channel T, already mentioned, which connects the said passages R with orifices U formed in the external boss or prolongation $b$ of the member B1. All the orifices U open out into an annular chamber $I^1$ of a collector I rotatably mounted upon the boss or prolongation $b$ of the member B1, this collector I communicating with a vertical branch $I_2$ connected to an escape pipe J.

The member B2 at the opposite end of the roll A comprises an external boss or prolongation $b2$ forming a trunnion or bearing connected by a sleeve K provided with a stuffing box M to a water-exit tube L, upon which there is fitted a pipe N; these parts are arranged in such a way that the tube L can remain stationary and the pipe N remains vertical, when the roll revolves in use.

This member B2 has similar parts and arrangements O, P, Q, R, S, S1, to those described above with reference to the member B1, but in the present case all the passages R lead into a cylindrical chamber V separated from the compartment A2 by a plate W. The cylindrical chamber V communicates with the exterior by the water-exit tube L and the pipe N.

The central feed chamber G, already mentioned, into which the tube F extends, has a certain number of orifices G1 in communication with channels G2 opening out into the compartments A1 A2 (see particularly Figure 3).

The operation of the improved spreading roll is as follows:—The water supplied through the pipe D, with a pressure greater than the resistance of the exit-pipes, is conducted by the tube F into the central feed chamber G, whence it is distributed by the orifices G1 and the channels G2, so as to pass in equal proportions into the two compartments A1 and A2.

The supply being the same on both sides, the level of water therefore rises simultaneously in these two compartments and the air which tends to remain above the water is driven out progressively through the following passages:—

(1) At the extremity B1, by way of the channels O, the annular chamber P, the orifices Q, the radial passages R, the exit-channel T, the orifices U, the annular chamber $I_1$ of the pipe I, the vertical channel $I_2$ and lastly the discharge pipe J.

(2) At the extremity $B_2$, by way of the passages O, P, Q, R, similar to the foregoing, the cylindrical chamber V, the tube L and the pipe N.

When the water reaches the channel O occupying the highest position, the interior of the roll is free from air and full of water.

It may with advantage be mentioned that this result is obtained in a perfect manner by reason of the dimensioning of the various diameters as already explained above.

When all the air is driven out, the cooling water in its exit adopts the path previously followed by the air and escapes in equal proportions on the left through the pipe J and on the right through the pipe N.

The arrows in Figure 1 indicate the path followed by the cooling water from the time of its entry into the spreading roller.

Lastly, it is to be noted that the pipes J and N are maintained vertical by any suitable means (not shown); the exit of water has therefore to take place at a fair height above the highest level of the roller, so that in case of accidental interruption in the supply of water the roll will remain filled with water having a pressure due to a head equal to $h$; if the heating of the roll converts a part of this water into steam, the latter can escape freely through the pipes J and N.

Naturally, as already mentioned, the supply of water may be effected at both ends of the roller; in this case the member $B_2$ would be arranged identically and symmetrically with the member $B_1$, the water entering the central feed chamber G at both sides.

Figures 4 and 6 to 10 show a form of construction according to the invention, more particularly applicable to very long rolls in which an incurvation or longitudinal concavity of the outer surface would be inevitable if they were formed in the ordinary manner or as described with reference to Figures 1 to 3.

Referring to Figure 4, the outer wall is here constituted by juxtaposed cylinders $a_1$, $a_2$, $a_3$, $a_4$, which are fitted over the inner cylinder $A_3$; the outer edges of the said juxtaposed cylinders are bevelled as shown at $i$ in such a way that when the cylinders are fitted in place end to end, external circular grooves are formed at their junctions. Bonding metal is run or welded into these grooves, as at $c$, and the excess of metal is removed in such a way that a single composite jacket A' having a perfectly smooth outer surface is afforded.

The cylinder $A_3$ is hollow and its interior capacity constitutes the central supply chamber G'. Passages $j$ are drilled or otherwise formed approximately at the middle of the length of the roll, but spaced alternately upon two circumferences in such a way as not to endanger the strength of the cylinder $A_3$; these passages $j$ connect the capacity G' with longitudinal channels $w$ formed at the periphery of the cylinder $A_3$; see in particular Figures 6 and 10.

Between the channels $w$ there is left sufficient material to support the outer jacket A' and at the middle of the length of the roller, the walls of material between the channels $w$ are increased in height to form a cylindrical enlargement $e$ upon the inner cylinder $A_3$; this enlargement fits into corresponding recesses formed in the thickness of the contiguous cylinders $a_2$ $a_3$ in such a way as to obviate distortion due to unequal expansions of the cast-iron cylinder $A_3$ and the steel jacket A'.

The end members $B_1'$—$B_2'$ comprise bosses or prolongations $b_2'$—$b_2'$ forming trunnions, these being of smaller diameter than the cylinder $A_3$.

The admission of cooling water takes place at the two ends; the water supplied through the pipes D' passes along the bores $f$ of the end members $B_1'$—$B_2'$ in symmetrical relation and flows into the central supply chamber G'. It is then distributed by the passages $j$ into the channels $w$ and escapes in equal parts at the two ends through passages $O_1$ $R_1$ formed in the members $B_1'$—$B_2'$, these end passages being of simpler construction than those described with reference to Figures 1 and 2, but having the same characteristics (see particularly Figures 7 and 8).

The water finally escapes at each end by the annular channel $t$ concentric with the bore $f$, and through the ports U', the annular chamber $I_1'$ of the union I', and the channel $I_2'$ which in this example possesses the shape shown in Figure 9.

Figure 5 represents a modified arrangement of the longitudinal channels $w$; these instead of being straight are inclined from the two sides towards the middle, in such a way that as a result of the rotation of the roller, the bubbles or particles of air which may exist in suspension in the water are swept out and evacuated without difficulty.

It will be obvious that without exceeding the scope of the invention, the constituent elements of the improved spreading roll may be arranged in such a way as to provide other modifications operating in practice in the same way as the example of construction described above.

What I claim is:—

1. A glass-spreading roll, comprising a hollow cylindrical body, means for dividing the interior of said body into two compartments of equal capacity located symmetrically of its central transverse plane, means for supplying cooling water to the interior of said body in the vicinity of said central plane, end closures at opposite ends of said roll, said closures fitting into counterbored portions of greater internal diameter than the remainder of the interior of said body, annular chambers in said closures, water channels connecting said annular chambers with said counterbored portions, said water channels and said annular chambers being of external diameters greater than the internal diameter of said counterbored portions, and means for the escape of water from said annular chambers.

2. A glass-spreading roll, comprising a hollow cylindrical body, means for dividing the interior of said body into two equal capacities located symmetrically of said central plane, means for distributing said water equally to said two capacities, end closures at opposite ends of said roll, said closures fitting into counterbored portions of greater internal diameter than the remainder of the interior of said body, annular chambers in said closures, water channels connecting said annular chambers with said counterbored portions, said water channels and said annular chambers being of external diameters greater than the internal diameter of said counterbored portions, and means for the escape of water axially through said end closures.

3. A glass-spreading roll, comprising a hollow cylindrical body bored out in the middle and for the greater part of its length to one radius and counter-bored to a larger radius at its opposite extremities, a central feed chamber dividing the interior of said body into two compartments of equal capacity, means for supplying cooling water to the interior of said feed chamber, said feed chamber having channels at its periphery adjacent to the bored interior of said body, orifices connecting said channels with the interior of said feed chamber, and means for equalizing the escape of water from the opposite ends of said roll, said means allowing the escape of contained air from the counterbored extremities of said body.

In testimony whereof I hereunto affix my signature.

PAUL JOSEPH MAXIMILIEN ESCOLE.